UNITED STATES PATENT OFFICE.

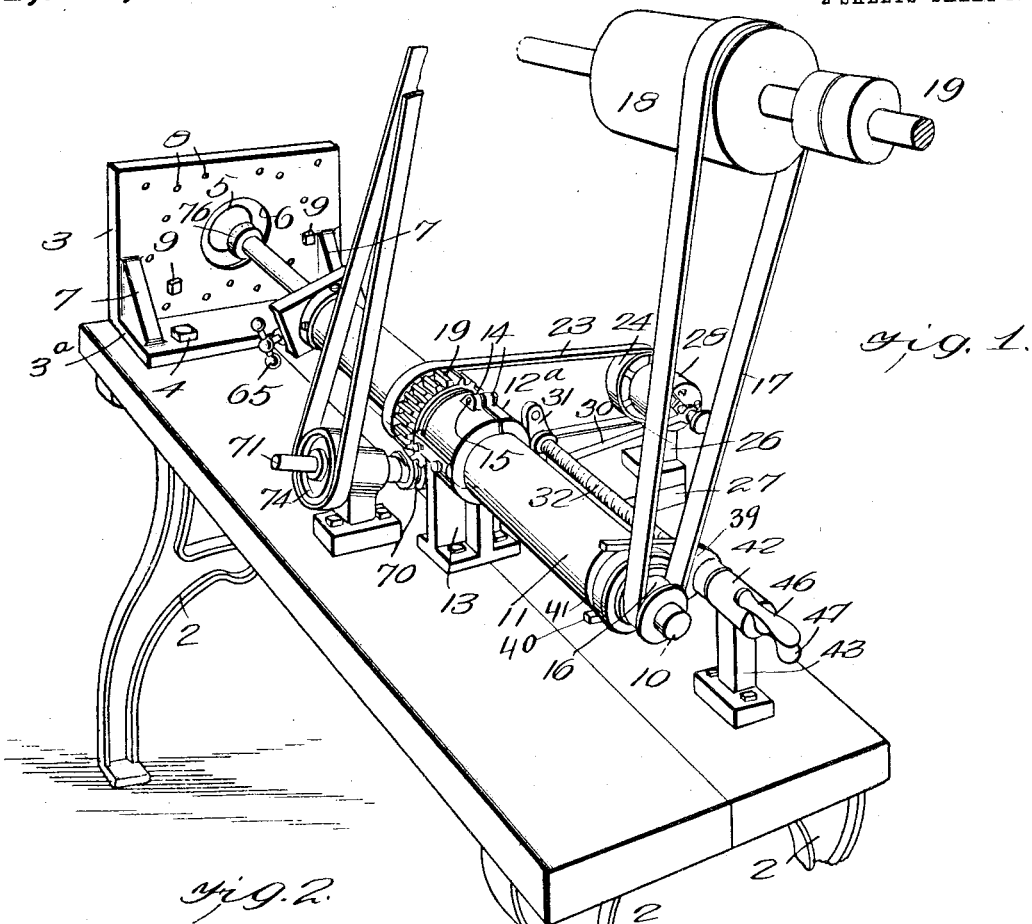

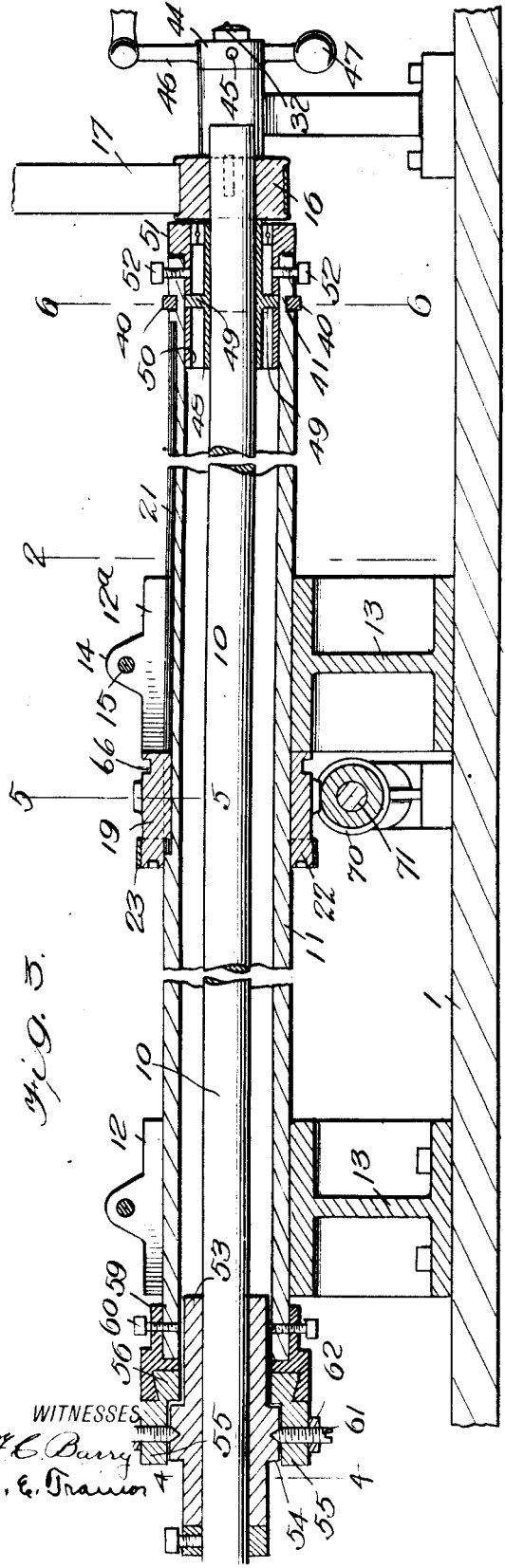
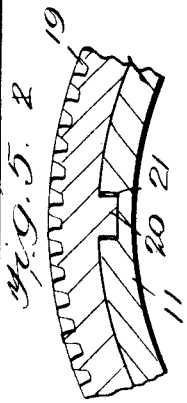
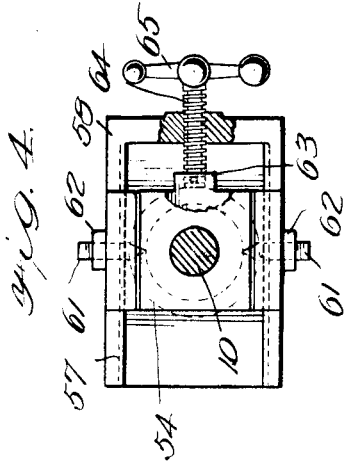
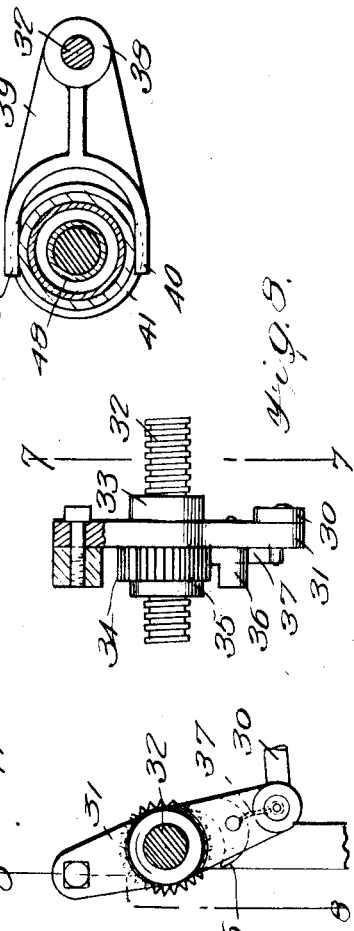

ROYDEN KEITH McDOUGAL, OF LINCOLN, NEBRASKA.

GRINDING-MACHINE.

1,131,398.  Specification of Letters Patent.  Patented Mar. 9, 1915.

Application filed August 4, 1914. Serial No. 854,914.

*To all whom it may concern:*

Be it known that I, ROYDEN K. MCDOUGAL, a citizen of the United States, and a resident of Lincoln, in the county of Lancaster and State of Nebraska, have made certain new and useful Improvements in Grinding-Machines, of which the following is a specification.

My invention is an improvement in grinding machines, and has for its object to provide a machine of the character specified, especially adapted for grinding the cylinders of explosion engines, without the necessity of moving the cylinder, and wherein all of the cylinders of a multi-cylinder engine may be ground, without the necessity of clamping the cylinders, with the consequent distortion of the bore.

In the drawings: Figure 1 is a perspective view of the improved grinding machine, Figs. 2, 4, 5 and 6 are sections on the lines 2—2, 4—4, 5—5, and 6—6, respectively, of Fig. 3, Fig. 3 is a longitudinal vertical section, Fig. 7 is a section on the line 7—7 of Fig. 8, Fig. 8 is a section on the line 8—8 of Fig. 7, and Fig. 9 is a partial horizontal longitudinal section.

The present embodiment of the invention is shown supported by a table 1 having supporting legs 2 at its ends, and the table is provided at one end with an angle plate, consisting of portions 3 and 3ª, arranged at a right angle with respect to each other. The portion 3ª of the angle plate is bolted to the table, as indicated at 4, at one end thereof, and the portion 3 is provided with an opening 5 at its center, adapted to register with the openings of the cylinders to be bored. The opening 5 is counterbored, as indicated at 6, and the portion 3 is braced against the portion 3ª by inclined braces 7. The portion 3 is also provided with openings 8 for receiving clamping bolts for clamping the engine to the angle plate.

The grinding machine comprises a grinding shaft 10, which is mounted in a tube or cylinder 11 in a manner to be presently described, the tube or cylinder being supported in split bearings 12 and 12ª in bearing standards 13 which are secured to the table in any suitable manner. Each of the split bearings is provided with lugs 14 through one of which is passed a bolt 15, and the said bolt is threaded into the other lug, to permit the bearing to be adjusted on the tube.

The shaft 10 extends beyond the tube 1 at both ends, and at the rear end a pulley 16 is keyed to the shaft, the pulley being adapted for engagement by a belt 17 for connecting the pulley to a whose pulley 18 on a power shaft 19 suitably supported above the table 1.

As the shaft 10 moves longitudinally of the tube 11, the belt will be carried with the pulley 16, made on the pulley 18. The flanges of the pulley will keep the belt to move with the shaft. A ring 19 is keyed to the tube by means of a key on the inner surface of the ring which engages a keyway 21 extending longitudinally of the tube and the ring is attached at its front end to a plain pipe 22 which is united to ...  23, which connects with a pulley 24 on a counter... ing standard 26 ... end exten- sion 27 from the ...

A disk 28 ... adjacent to the pulley, and the ... with an eccentric ... by one end of a ... end of the link is pivoted ... cross head of ... threaded rod 32, the said ... the shaft. The ... is provided with a contact bearing ... the rod, and ratchets ... jacent to the cross ... ratchet wheel has a hub 35 which ... the screw and is pinned to the ... when the ratchet wheel is moved ... must move therewith. A dowel ... pivoted to the cross head ... the side of the rod, the pawl being ... to engage the ratchet with either ... A spring 37 is secured at one end to ... and the other end of the spring ... to the pawl in each position ... to hold the pawl with either end ... in contact with the ratchet wheel.

It will be seen that as the tube 11 is rotated, the disk 28 will be rotated through the belt 23, and the link 30 will be reciprocated to vibrate the cross head, and as the cross head vibrates or oscillates the feed screw will move therewith, the direction depending upon the end of the pawl which engages the ratchet wheel.

At the opposite end from the cross head the feed screw is threaded through a nut 38 on the ...

gage an annular groove 41 in the tube. It will be evident that when the feed screw is rotated in either direction, the fork 39—40 will be moved longitudinally thereof, the direction of movement depending upon the direction of movement of the feed screw, and the tube 11 will be carried with the feed screw.

The rear end of the feed screw is journaled in a bearing 42 in a bearing standard 43 secured to the table, and a collar 44 encircles the shaft and is secured thereto by means of a pin 45. The collar is provided with oppositely extending arms, one of which 46 is a crank, and the other 47 is a counterbalance for the crank. By means of the crank the feed screw may be rotated manually.

The shaft 10 is journaled in a bushing or bearing sleeve 48 which is provided with oppositely extending trunnions 49, which engage openings in a sleeve 50, which fits within the rear end of the tube 11. The sleeve 50 is provided with an annular rib 51, that fits against the rear end of the tube, and set screws 52 are threaded through the tube 11 opposite each other, the said screws engaging at their inner ends openings in the sleeve 50. The arrangement is such that the sleeve 48 may swing laterally with respect to the sleeve 50, being supported by the trunnions 52. The opposite end of the shaft is engaged by a sleeve 53, which is provided with an enlargement 54 intermediate its ends, having a square peripheral surface. This enlargement 54 fits between upper and lower blocks 55, each of which is provided with an extension 56, which engages an under cut guideway 57 in a guide plate 58, arranged transversely of the front end of the tube. The guideway has a tubular extension 59 which fits over the front end of the tube 11, and is connected thereto by means of set screws 60. These screws pass through the extension and through the openings in the tube 11, to hold the guide plate to the tube. Pointed screws 61 are threaded through the blocks 55, and the inner pointed end of each screw engages a conical opening in the enlargement 54. Each screw is provided with a lock nut 62, for preventing accidental displacement thereof. The enlargement 54 is provided at one side with an extension 63, and a screw 64 is threaded through one end of the guide plate, and the inner end of the screw is journaled in the extension. The outer end is provided with a handle 65 for convenience in turning the same. It will be evident that by turning the screw, the bearing sleeve 53 of the front end of the shaft may be moved laterally.

The gear ring 19 before mentioned, is held from movement with the tube 11, by the mechanism shown in Fig. 9. It will be noticed that at the end adjacent to the bearing 12ª the gear ring 19 is provided with an annular groove 66, and that this groove is engaged by a lug 67 on a plate 68 which is secured to the bearing 12ª, by means of screws 69. The gear ring is keyed to the tube 11, but cannot move therewith, being held at the bearing 12ª regardless of the position of the tube, and at the same time when the gear ring is rotated the tube will rotate therewith. The gear ring 19 is in fact a worm wheel, and is engaged by a worm 70 on a worm shaft 71 journaled in inclined bearings 72 on bearing standards 73 secured to the table. The outer end of the shaft is provided with a pulley 74 which is connected by means of a belt 75 with a suitable power shaft, not shown. When the pulley 74 is rotated, the worm shaft will be rotated, and the worm will drive the tube 11. The grinding shaft is rotated from the belt 17.

The engine having the cylinders to be ground is bolted to the portion 3 of the plate 3—3ª, by means of the bolts 9, and with the cylinder to be ground in register with the opening 5. After the cylinder is in place, the bearing sleeve 53 is moved laterally until the grinding wheel 76 on the front end of the shaft describes a circle of the internal diameter to which it is intended to grind the cylinder.

In operation, the engine whose cylinders are to be ground is bolted to the portion 3 of the plate 3—3ª, with the cylinder to be ground in register with the opening 5. The shaft and the tube 11 are connected with the source of power, and as the shaft 10 rotates on its longitudinal axis, the wheel 76 is also revolved about the central axis of the tube 11, and the cylinder is ground out smoothly and uniformly.

In the ordinary manner of carrying out the grinding, the cylinder is clamped transversely of its bore, and it will be obvious that if there is the slightest springing of the cylinder, after the grinding, and after it has been released from the clamp, the bore will not be precisely a uniform cylinder. With the present construction, however, there is no stress transverse to the cylinder, and the bore is exactly cylindrical when finished. As the tube is rotated, the shaft 25 is rotated, and the cross head 31 is oscillated. The feed screw will be turned in a direction to move the tube toward the plate 3—3ª, and the feed is arranged to feed the shaft at the proper speed to properly grind out the cylinder. After the cylinder has been ground the tube may be returned by reversing the pawl 36, or it may be turned manually by means of the crank 46.

The position of the bearing sleeve 53 determines the diameter of the circle which will be ground by the wheel. The gear ring 19 is held to the bearings 12—12ᵃ by the mechanism shown in Fig. 9, and cannot move longitudinally with the tube.

I claim:

1. A machine of the character specified, comprising a tube or cylinder, bearings for supporting the cylinder, a shaft arranged within the cylinder and extending beyond the cylinder at each end thereof, a grinding wheel at one end of the shaft, a pulley at the other end and adapted for connection with a source of power to rotate the shaft, a worm gear ring feathered on the tube, a worm shaft engaging the ring and having means for connection with a source of power, a bearing sleeve for the shaft at the end adjacent to the pulley, said sleeve being provided with oppositely extending trunnions intermediate its ends, a sleeve fitting within the tube at the said end and having openings for engagement by the trunnions, said last-named sleeve being detachably connected with the cylinder, a bearing sleeve for the opposite end of the shaft, a guide detachably connected with the adjacent end of the tube, said bearing sleeve having means for engaging the guide to permit the said end of the shaft to be adjusted laterally with respect to the tube, means for moving the sleeve, and feeding means for the tube operated by the rotation thereof, said means comprising a feed screw journaled adjacent to the tube and parallel therewith, manual means connected with the screw for operating the same, means for partially rotating the tube at predetermined intervals, and a connection between the tube and the said means for operating the same, said partially rotating means comprising a cross head journaled on the screw, a ratchet wheel secured to the screw adjacent to the cross head, a pawl on the cross head for engaging the wheel, said pawl being reversible, and a connection between the screw and the tube for moving the tube longitudinally when the screw is rotated.

2. A machine of the character specified, comprising a tube or cylinder, bearings for supporting the cylinder, a shaft arranged within the cylinder and extending beyond the cylinder at each end thereof, a grinding wheel at one end of the shaft, a pulley at the other end and adapted for connection with a source of power to rotate the shaft, a worm gear ring feathered on the tube, a worm shaft engaging the ring and having means for connection with a source of power, a bearing sleeve for the shaft at the end adjacent to the pulley, said sleeve being provided with oppositely extending trunnions intermediate its ends, a sleeve fitting within the tube at the said end and having openings for engagement by the trunnions, said last-named sleeve being detachably connected with the cylinder, a bearing sleeve for the opposite end of the shaft, a guide detachably connected with the adjacent end of the tube, said bearing sleeve having means for engaging the guide to permit the said end of the shaft to be adjusted laterally with respect to the tube, means for moving the sleeve, and feeding means for the tube operated by the rotation thereof, said means comprising a feed screw journaled adjacent to the tube and parallel therewith, manual means connected with the screw for operating the same, means for partially rotating the tube at predetermined intervals, a connection between the tube and the said means for operating the same, and a connection between the screw and the tube for moving the tube longitudinally when the screw is rotated.

3. A machine of the character specified, comprising a tube or cylinder, bearings for supporting the cylinder, a shaft arranged within the cylinder and extending beyond the cylinder at each end thereof, a grinding wheel at one end of the shaft, a pulley at the other end and adapted for connection with a source of power to rotate the shaft, a worm gear ring feathered on the tube, a worm shaft engaging the ring and having means for connection with a source of power, a bearing sleeve for the shaft at the end adjacent to the pulley, said sleeve being provided with oppositely extending trunnions intermediate its ends, a sleeve fitting within the tube at the said end and having openings for engagement by the trunnions, said last-named sleeve being detachably connected with the cylinder, a bearing sleeve for the opposite end of the shaft, a guide detachably connected with the adjacent end of the tube, said bearing sleeve having means for engaging the guide to permit the said end of the shaft to be adjusted laterally with respect to the tube, means for moving the sleeve, feeding means for the tube operated by the rotation thereof, and a connection between the screw and the tube for moving the tube longitudinally when the screw is rotated.

4. A machine of the character specified, comprising a cylinder, bearings for supporting the cylinder for rotation, a shaft arranged within the cylinder and extending beyond the same at each end thereof, a grinding wheel at one end of the shaft, a pulley at the other end and adapted for connection with a source of power to rotate the shaft, means for rotating the cylinder, a bearing sleeve for the shaft at the end adjacent to the pulley, said sleeve having oppositely arranged trunnions pivoted to the cylinder, a bearing sleeve for the other end of the shaft, a guide plate detachably connected with the said end of the cylinder, means in connection with the bearing sleeve for engaging the guide plate to guide the bearing sleeve laterally with respect to the cylinder, means for moving the sleeve, and means for feeding the cylinder, said means comprising a screw journaled parallel with the cylinder, means for imparting intermittent rotation to the feed screw, and a driving connection between the cylinder and the said means.

5. A machine of the character specified, comprising a cylinder, bearings for supporting the cylinder for rotation, a shaft arranged within the cylinder and extending beyond the same at each end thereof, a grinding wheel at one end of the shaft, a pulley at the other end and adapted for connection with a source of power to rotate the shaft, means for rotating the cylinder, a bearing sleeve for the shaft at the end adjacent to the pulley, said sleeve having oppositely arranged trunnions pivoted to the cylinder, a bearing sleeve for the other end of the shaft, a guide plate detachably connected with the said end of the cylinder, means in connection with the bearing sleeve for engaging the guide plate to guide the bearing sleeve laterally with respect to the cylinder, means for moving the sleeve, and means for feeding the cylinder, said means being operated by the rotation of the cylinder.

6. A machine of the character specified, comprising a cylinder, a grinding shaft within the cylinder, means for supporting the cylinder for rotation, means for rotating the cylinder, means operated by the rotation of the cylinder for feeding the cylinder longitudinally, said means being reversible, said shaft extending beyond the cylinder at each end thereof, and having at one end a grinding wheel and at the other a pulley for connection with a source of power, a bearing for the shaft at the end adjacent to the pulley and pivoted to the cylinder, a bearing for the opposite end of the shaft movable laterally with respect to the cylinder, means for moving the bearing laterally, and means for guiding the bearing in its lateral movement.

7. A machine of the character specified, comprising a cylinder, a grinding shaft within the cylinder, means for supporting the cylinder for rotation, means for rotating the cylinder, means operated by the rotation of the cylinder for feeding the cylinder longitudinally, said means being reversible, said shaft extending beyond the cylinder at each end thereof, and having at one end a grinding wheel and at the other a pulley for connection with a source of power, a bearing for the shaft at the end adjacent to the pulley and pivoted to the cylinder, and means for moving the other end of the shaft laterally with respect to the cylinder.

8. A machine of the character specified, comprising a grinding shaft provided at one end with a grinding wheel, a pulley at the other end of the shaft and adapted for connection with a source of power to rotate the shaft, a support for the shaft, the shaft being rotatable with respect to the support, means in connection with the support for constraining the end of the shaft provided with the grinding wheel to revolve about the axis of rotation of the pulley.

ROYDEN KEITH McDOUGAL.

Witnesses:
RUTH E. PENNINGTON,
HARRY E. HUBER.